Figure 1:
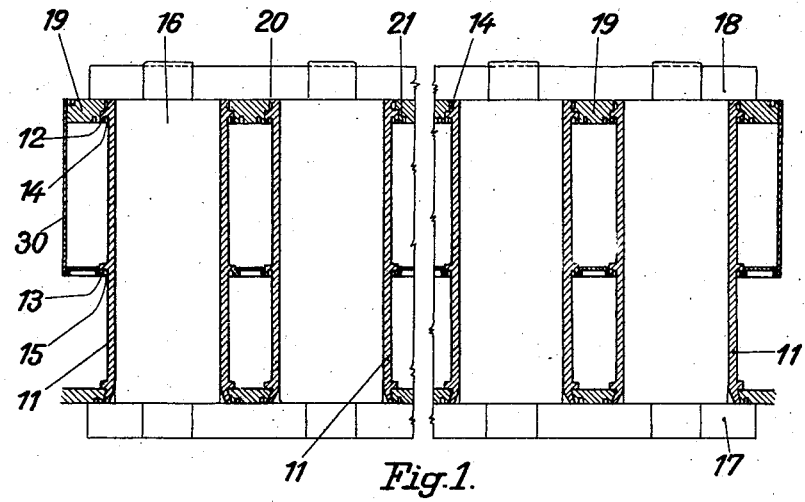

Jan. 7, 1930.  J. FEJES  1,743,031

MANUFACTURE OF INTERNAL COMBUSTION ENGINES

Filed Aug. 20, 1928

Inventor:
J. Fejes

Patented Jan. 7, 1930

1,743,031

UNITED STATES PATENT OFFICE

JENÖ FEJES, OF BUDAPEST, HUNGARY

MANUFACTURE OF INTERNAL-COMBUSTION ENGINES

Application filed August 20, 1928, Serial No. 300,770, and in Austria June 27, 1928.

This invention relates to a method of manufacturing internal combustion engines composed of a plurality of parts welded together and relates more particularly to engine constructions with a removable cylinder head, in which the separate cylinders and a common frame, in which the separate cylinders are mounted, are formed of steel bodies, while the remaining parts, such as the suction and exhaust branches, the cooling jacket and its end parts, reinforcing and connecting members, and in general those parts which are not subjected to heavy mechanical stresses are formed of sheet metal. Such an engine block is of considerably less weight than a cast block, but in contradistinction thereto consists of many parts welded together. The object aimed at in the construction of these so-called sheet metal engines is not only a saving in weight as compared with the block engines cast in one piece, but a saving in the manufacturing costs. In the construction of these engines the procedure has been similar to that followed in the case of engines made by casting, the block being first built up from its parts and the surfaces requiring tooling, such as the inside surfaces of the cylinder walls, the valve shank guides and the valve seatings being thereupon tooled. This method of working, however, was uneconomical. The cylinders being inserted as separate pieces in the common frame and being then welded results in inaccuracies in the composite block, the cylinder axes, for instance, not being parallel to one another. The same inaccuracies are found in the valve spindle guides and in other parts of the block, which are all due to the fact that a structure consisting of many parts cannot be put together with the requisite accuracy and that, even if this should be possible, through welding the parts together distortions are produced in the block during the subsequent cooling. Such inaccuracies are difficult to correct in the subsequent tooling of the sliding surfaces. To this must be added that these subsequent operations increase the manufacturing costs.

The present invention relates to a method by which the difficulties referred to are overcome. According to the invention the tooling on all the parts of the block is finished before the parts are put together, the cylinders are thereupon rigidly fixed in a contrivance serving specially for this purpose, which will be described below, in the position which they are to occupy in the finished block, after which the frame common to all the cylinders is placed in position and welded to the cylinders. Similarly the valve spindle guides are rigidly fixed in the same contrivance in the position they are to occupy in the finished block, after which they are united to the other parts of the block. As the whole block remains on the mandrels of the contrivance until the work is finished and the block has cooled, the said mandrels holding the most important parts in their final position, no inaccuracies can occur in the finished block and all the parts, more particularly the cylinders and valve guides, will fit exactly according to the prescribed dimensions.

Figures 2, 3:
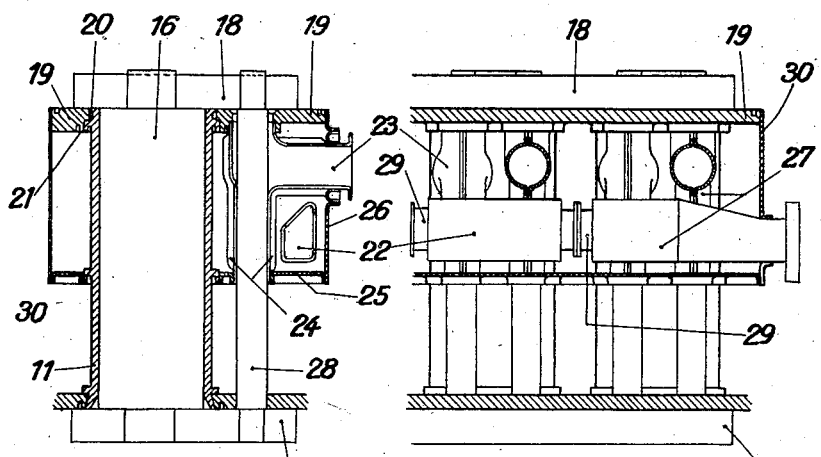
Figure 4:
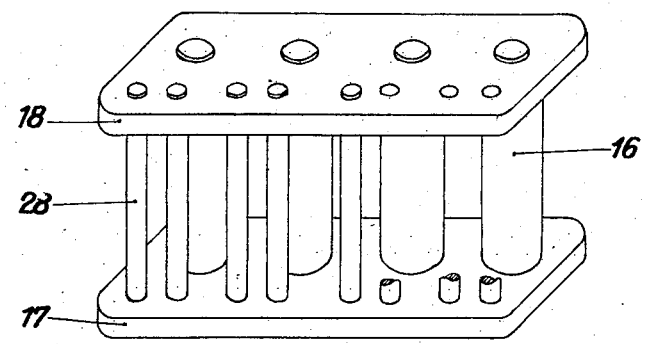

For more particularly illustrating the method, the drawing illustrates a four cylinder engine with the cylinder head removed and after being assembled, Fig. 1 being a longitudinal section through the centre of the cylinders, Fig. 2 a cross-section through the cylinder axis and the exhaust valve, Fig. 3 a side elevation and Fig. 4, in perspective, the contrivance used for the welding process.

The separate cylinders 11 made of sheet steel tubing are accurately bored out before being put together to within 0.2 mm. of the finished diameter and are provided at their outer surface with welding ribs 12, 13 which are separated from the cylinder body by annular grooves 14, 15. The object of this is to localize the heat in the welding ribs themselves. The cylinders previousy finished in this way are slipped separately on to the mandrels 16 of the contrivance shown in Fig. 4. The mandrels 16 are rigidly fixed in a thick base plate 17 and are in addition supported firmly by the removable upper plate 18. The mandrels are so turned that they will fit accurately into the bore of the cylinders which have been bored out to within 0.2 mm. of the finished diameter. After the cylinders have been slipped on to the mandrels, the common frame 19, into which the cylinders can be screwed, for instance by means of a thread 20, and the cover plate 18 are placed on them. The welding ribs 12 of the cylinders and the corresponding welding ribs 21 of the frame 19 are thereupon welded together.

The part consisting of the suction pipe 22, the exhaust pipe 23, the valve spindle guides 24 and the reinforcing members 25, 26 and so on, for the cylinder, shown in Fig. 3 by thin lines, is preferably assembled beforehand, so that the finished pieces 27 (Fig. 4) can be slipped on to the mandrels 28 before the upper cover plate 18 is placed in position.

The suction and exhaust branches are thereupon welded into the frame 19, the suction pipe branches 29 of the parts 27 are welded together and the cooling jacket 30 and any other parts are welded to the block.

By using the contrivance described it is possible to align the cylinder axis and the valve spindle guides exactly parallel to one another and the correct distance apart. After the block has been removed from the contrivance, it is only necessary to ream out the cylinder walls for obtaining smooth sliding surfaces by removing the 0.1 mm. thick layer. The advantage of the described method consists more particularly in this, that all the parts of the block are finished separately beforehand and can therefore be made by mass production and that no subsequent tooling is required on the welded block, since there can be no subsequent distortion caused by the welding. By this means the manufacturing costs are considerably reduced as compared with the engine made by the cast process and it becomes possible to make sheet metal engines in an economical manner by mass production.

What I claim is:

1. An apparatus for manufacturing multi-cylinder internal combustion engines composed of a plurality of pressed steel parts and a plurality of sheet metal stampings, comprising in combination a base plate, a plurality of mandrels fixed in the said plate and spaced accurately to correspond to the distance apart of the axes of the cylinders and valve spindles and a cover plate capable of being placed on the said mandrels after the cylinders and valve spindle guides have been slipped on to them, as and for the purpose set forth.

2. An apparatus for manufacturing multi-cylinder internal combustion engines having removable cylinder heads and composed of a plurality of pressed steel parts and a plurality of sheet metal stampings, comprising in combination a base plate, a plurality of mandrels fixed in the said plate and spaced accurately to correspond to the distance apart of the axes of the cylinders and valve spindles and a cover plate capable of being placed on the said mandrels after the cylinders and valve spindle guides have been slipped on to them, as and for the purpose set forth.

In testimony whereof I have signed my name to this specification.

JENÖ FEJES.